United States Patent [19]

Murakami

[11] 4,334,233
[45] Jun. 8, 1982

[54] OPTICAL RECORDING ELEMENT AND ITS MANUFACTURING METHOD

[75] Inventor: Teruo Murakami, Yokohama, Japan

[73] Assignee: Tokyo Shibaura Denki Kabushiki Kaisha, Kawasaki, Japan

[21] Appl. No.: 165,049

[22] Filed: Jul. 1, 1980

[30] Foreign Application Priority Data

Jul. 16, 1979 [JP] Japan .................................. 54-89272

[51] Int. Cl.³ ...................... G01D 15/34; G01D 15/10
[52] U.S. Cl. ................................. 346/135.1; 346/76 L
[58] Field of Search ........................... 346/76 L, 135.1

[56] References Cited

U.S. PATENT DOCUMENTS 3,665,483  5/1972  Becker et al. ................ 346/135.1 X
4,238,803  12/1980  Terao et al. ................ 346/135.1 X
4,242,689  12/1980  Bloom et al. ..................... 346/135.1

Primary Examiner—George H. Miller, Jr.
Attorney, Agent, or Firm—Oblon, Fisher, Spivak, McClelland & Maier

[57] ABSTRACT

An optical recording element capable of recording and retrieving information by means of beam radiation, comprising a recording layer vacuum deposited onto a protective layer, and an adhesive layer which securely adheres said recording layer to a substrate. The protective layer is prepared from a light-transmitting sheet or plate, with no adhesive layer intervening between the protective layer and the recording layer, so that the influence of dust and bubbles in recording and retrieval can be minimized.

7 Claims, 8 Drawing Figures

OPTICAL RECORDING ELEMENT AND ITS MANUFACTURING METHOD

BACKGROUND OF THE INVENTION

The present invention relates to an optical recording element which is capable of recording and retrieving information by means of laser beam radiation or the like, and the manufacturing method thereof.

A conventional optical recording element such as a video disk has a structure as shown in either FIG. 1 or FIG. 2. In FIG. 1, it consists of a recording layer 2 which is vacuum deposited onto a substrate 1, and a protective layer 3 which is formed by coating an organic material solution on the recording layer 2 by dipping or by means of a spinner, an applicator, or the like, followed by curing. In FIG. 2, it comprises a recording layer 6 which is vacuum deposited onto a substrate 5, and a protective layer 8 which is bonded to the recording layer 6 with an adhesive 7. Such a protective layer protects the recording layer from dust and damage, and prevents the condensing lens from being contaminated by scattered recording material when information pits are recorded.

As shown in FIG. 3, recording and retrieving of information with the optical recording element is done by a beam 11 which is focused on a recording layer 15, for example 1 to 1.5 $\mu$m in diameter, using a converging lens 10. When the recording layer 15 is irradiated with the recording beam in response to a recording signal, the recording material of only the irradiated portion of the recording layer 15 evaporates or melts to form a record pit 16. Upon retrieval, the intensity of the retrieval beam reflected from the record pit 16 is markedly different from that reflected by other spots that lack the record pit 16. Accordingly, the signal can be retrieved by detection of variations in the intensity of the reflected beam caused by the presence or absence of the record pit 16. A detector 13 and a beam splitter 12 may be used for this purpose.

In such recording and retrieving, dust 18 and scratch 19 on the surface of the protective layer 17 are important causes of imprecise recording and retrieval. If dust of about 20 $\mu$m diameter, which represents the greatest proportion in a general environment such as an office room, is deposited on the protective layer surface, the beam-focusing diameter on the protective layer surface has to be made so large that the influence of dust of this size becomes negligible. According to the description of IEEE vol. CE-20, No. 9 (1976), pp. 309–316, the thickness of the protective layer must be at least 200 $\mu$m if the influence of dust of 20 $\mu$m in diameter is to be negligible. Since forming such a thick protective layer by vacuum deposition takes quite a long time, it is formed either by coating and curing of an organic material solution as shown in FIG. 1, or by bonding a light-transmitting film to the recording layer as shown in FIG. 2.

Such conventional methods, however, present difficulties in completely removing dust, foreign substance and bubbles from the organic material solution or the adhesive. Also, dust and bubbles are apt to be included during formation of the protection layer, so that special apparatus or equipment is required to prevent these. Because the dust and bubbles are located either within the protective layer or between the protective layer and the recording layer where the beam is incident, the beam will be scattered by hitting these particles during recording or retrieving, making recording or retrieving impossible or resulting in a noise increase, hence, a degradation in SN ratio, or still worse, disabling retrieval.

In FIGS. 1 and 2, examples having only a recording layer between the substrate and protective layer are shown, but in cases where another intermediate layer is included in addition to the recording layer, such as a silicon dioxide layer or an aluminum layer for the purposes of heat insulation, improvements of the retrieval SN ratio and recording sensitivity or the like, the aforementioned drawbacks are also involved.

SUMMARY OF THE INVENTION

The primary object of the present invention is to provide an optical recording element wherein not only the influence of dust and scratch remaining on the surface of the protective layer is rendered negligible, but also the path of the beam within the protective layer and between the protective layer and the recording layer is free of dust and bubbles.

The present invention provides an optical recording element comprising a recording layer which is vacuum deposited onto a light-transmitting protective layer, and a substrate adhered to the protective layer so as to sandwich the recording layer between the two. In this optical recording element, because the protective layer is made from a sheet of light transmitting material with no adhesive layer intervening between the protective layer and the recording layer, the influence of dust and bubbles can be minimized.

DETAILED DESCRIPTION OF THE INVENTION

Figure 4:
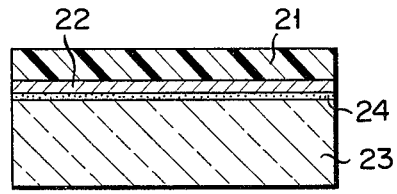
FIG. 4 is a sectional view of an embodiment of the optical recording element according to the present invention.

In FIG. 4, a protective layer 21 is fixed to a substrate 23 by means of an adhesive layer 24 with a deposited recording layer 22 between the adhesive and the protective layer. The protective layer 21 comprises a sheet of light-transmitting material, e.g. a thin plate glass, a thin plastic plate or a plastic sheet, preferably of low thermal conductivity. The thickness of the protective layer 21 is preferably at least 200 $\mu$m as stated before, to eliminate the influence of dust and scratch on its surface. With a thickness greater than 2.0 mm, however, design of the lens system becomes difficult.

The recording layer 22 can be made of a conventional material such as a low melting-point metal, e.g. tellurium or bismuth, or a conventional material such as a pigment. The substrate 23 can be of a conventional material such as a glass plate, a thin plastic plate or a plastic sheet which does not deform.

Figure 5A:
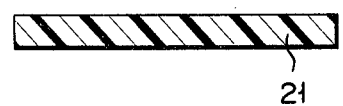
FIGS. 5A to 5C are sectional views showing the manufacturing process of the optical recording element shown in FIG. 4.
Figure 5B:
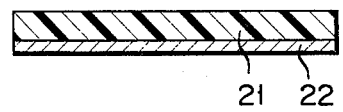
Figure 5C:
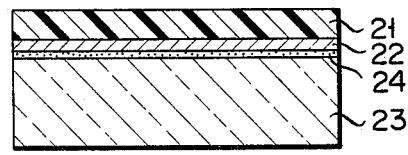

Now the manufacturing method of the optical recording element shown in FIG. 4 will be described concretely. First, the protective layer 21 consisting of either a thin glass plate, a thin plastic plate or a plastic sheet having high light transmissivity is prepared, as shown in FIG. 5A. Then the recording layer 22 of a predetermined thickness is vacuum-deposited by a conventional method onto the protective layer 21 with vacuum deposition device, as shown in FIG. 5B. Either on this recording layer 22 or on a separately prepared substrate 23, a conventional adhesive is applied by coating. As shown in FIG. 5C, arranging the recording layer 22 to face the substrate 23, the recording layer 22 is fixed to the substrate 23 using a conventional adhesive 24.

In the above embodiment shown in FIG. 4 and FIGS. 5A to 5C, an example with only the recording layer 22 as an intermediate layer between the substrate 23 and the protective layer 21 is shown, but in addition to the recording layer, another layer known among those skilled in the art such as an aluminum layer or silicon )dioxide layer can be formed to improve heat insulation, recording sensitivity and the retrieving SN ratio. All such intermediate layers must be formed by means of vacuum deposition. These intermediate layers, except for the recording layer, can be deposited either on the protective layer or on the substrate as needed, but continuous deposition on the protective layer is preferable.

In the above embodiment of the present invention, an example with a recording layer on one side of the substrate was mentioned, but two laminate structures of FIG. 5B can be adhered to both sides of a substrate. By such a modification, an optical recording element having a recording layer on both faces can be obtained.

Figure 1:
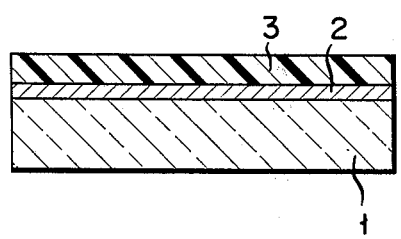
FIGS. 1 and 2 are sectional views of conventional optical recording elements.
Figure 2:
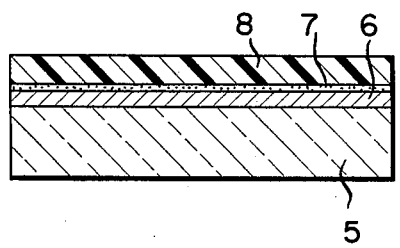
Figure 3:
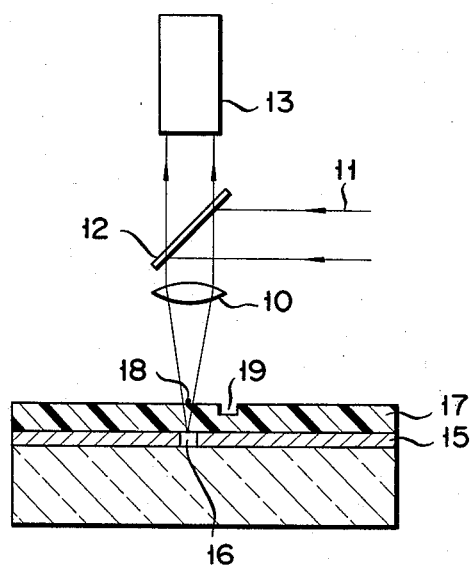
FIG. 3 is a schematic view showing a recording-retrieving optical system using a conventional optical recording element.
Figure 6:
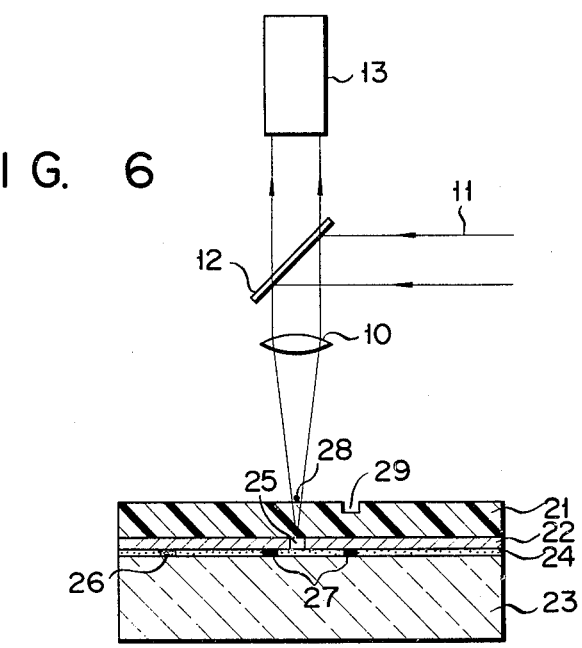
FIG. 6 is a schematic view showing a recording-reproduction optical system using the optical recording element according to the present invention.

Next, recording and retrieving with the optical recording element of the present invention will be explained referring to FIG. 6. In FIG. 6, the optical system is the same as that in FIG. 3, and the optical recording element is the same as that in FIG. 4. The beam 11 is reflected by the beam splitter 12, focused by the converging lens 10 and radiated onto the recording layer 22. In recording, a record pit 25 is formed on the recording layer 22 by the irradiation of this beam. In retrieval, the variation of the intensity of the reflected beam due to the presence or absence of the record pit 25 is detected by the detector 13 through the beam splitter 12.

The embodiment of the present invention will be further explained by the following example.

EXAMPLE

A protective layer of 30 cm in diameter was prepared from a 1.5 mm thick polymethyl-methacrylate sheet. After placing this protective layer in a vacuum chamber, a 400 Å thick tellurium layer was deposited on one side of the protective layer using a conventional method. A 30 cm diameter substrate was separately prepared from a 3.0 mm thick glass plate. On one side of this substrate was applied a conventional adhesive, and said protective layer was attached so that the tellurium layer contacts the adhesive layer. By curing the adhesive, a 30 cm diameter video disk was obtained.

According to the present invention, the protective layer is not formed by coating and curing of an organic material solution. Thus, a sheet material of high light transmissivity that is free from dust, bubbles and other foreign matter can be selected. Even if bubbles 26, dust 27, etc. are included in the adhesive layer 24 as shown in FIG. 6, they do not scatter the beam since the adhesive layer 24 is located on the side of the recording layer 22 toward the substrate 23. Therefore, high precision recording is possible, and the retrieval noise level can be reduced to improve the SN ratio. As for dust 28 and scratch 29 on the surface of the protective layer 21, their influence can be rendered negligible by forming a protective layer 21 thicker than 200 $\mu$m, as previously mentioned.

Because there is an adhesive layer 24 between the recording layer 22 and the substrate 23 which is less thermally conductive than the substrate, the heat generated in the portion of the recording layer 22 which is irradiated with the recording beam can be prevented from dissipating into the substrate 23. This accordingly results in more efficient formation of record pits.

Furthermore, adhesive layers being generally porous, vapor from the recording material generated during recording can be absorbed in the adhesive layer 24 which is in contact with the recording layer 22. By arranging the recording layer in contact with the adhesive layer, the influence of such vapor on recording and retrieving can thus be reduced.

The optical recording element of the present invention can be manufactured by no more than the conventional operations of vacuum depositing and adhesion, with the advantage that special equipment is not required.

What is claimed is:

1. An optical recording element comprising:
   a light-transmitting protective layer having thickness between 200 $\mu$m and 2.0 mm;
   intermediate layers including a recording layer and at least one of an aluminum layer and a silicon dioxide layer, said intermediate layers being deposited continuously onto said protective layer;
   a substrate fixed to said intermediate layers; and
   an adhesive layer located between said intermediate layer and said substrate to securely adhere said intermediate layer and said substrate, whereby a recording beam or a reproduction beam is irradiated onto said recording layer through said protective layer.

2. An optical recording element as claimed in claim 1, wherein said protective layer is either a thin glass plate or a plastic plate or sheet.

3. An optical recording element as claimed in claim 1, wherein said recording layer includes tellurium or bismuth.

4. An optical recording element as claimed in claim 1, wherein said adhesive layer is porous.

5. A method of manufacturing an optical recording element, comprising the steps of vacuum-depositing an intermediate layer including a recording layer on one side of a light-transmitting protective layer; applying an adhesive either on the surface of said intermediate layer or on the suurface of a substrate; and securely adhering said intermediate layer and said substrate with the adhesive.

6. A method as claimed in claim 5, wherein said protective layer is prepared from either a thin glass plate or a plastic plate or sheet of a thickness between 200 $\mu$m and 2.0 mm.

7. A method as claimed in claim 5, wherein said intermediate layer including a recording layer is continuously vacuum-deposited onto said protective layer.

* * * * *